(12) United States Patent
Acharya et al.

(10) Patent No.: US 8,364,784 B2
(45) Date of Patent: Jan. 29, 2013

(54) INTERNALLY INITIALIZED PROFILE DRIVEN DATA TRANSFER AND PROPAGATION

(75) Inventors: Amit P. Acharya, Morrisville, NC (US); Sudhakar Nagarajan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1576 days.

(21) Appl. No.: 11/132,905

(22) Filed: May 19, 2005

(65) Prior Publication Data

US 2006/0265502 A1 Nov. 23, 2006

(51) Int. Cl.
*G06F 15/16* (2006.01)
(52) U.S. Cl. .................................................... 709/219
(58) Field of Classification Search .......... 709/217–219, 709/220, 223, 225, 227–229
See application file for complete search history.

(56) References Cited

U.S. PATENT DOCUMENTS

| | | | |
|---|---|---|---|
| 6,487,406 B1 | 11/2002 | Chang et al. | |
| 6,646,999 B1 | 11/2003 | Kato et al. | |
| 6,675,208 B1 | 1/2004 | Rai et al. | |
| 6,763,226 B1 | 7/2004 | McZeal, Jr. | |
| 6,816,925 B2 | 11/2004 | Watts, Jr. | |
| 7,170,882 B2 * | 1/2007 | Karaoguz et al. | 370/338 |
| 7,653,744 B2 * | 1/2010 | Kanefsky et al. | 709/245 |
| 8,130,668 B2 * | 3/2012 | Agrawal et al. | 370/252 |
| 2002/0196793 A1 | 12/2002 | Samba et al. | |
| 2003/0032409 A1 * | 2/2003 | Hutcheson et al. | 455/414 |
| 2003/0041329 A1 | 2/2003 | Bassett | |
| 2004/0034808 A1 * | 2/2004 | Day et al. | 714/6 |
| 2004/0073873 A1 * | 4/2004 | Croney et al. | 715/526 |
| 2004/0100975 A1 * | 5/2004 | Kreiner et al. | 370/401 |
| 2004/0218046 A1 | 11/2004 | Kim | |
| 2004/0225752 A1 | 11/2004 | O'Neil et al. | |
| 2005/0001904 A1 * | 1/2005 | Kiiskinen | 348/207.1 |
| 2005/0266836 A1 * | 12/2005 | Shan | 455/417 |
| 2008/0178238 A1 * | 7/2008 | Khedouri et al. | 725/109 |
| 2010/0146124 A1 * | 6/2010 | Schauser et al. | 709/226 |

FOREIGN PATENT DOCUMENTS

| | | |
|---|---|---|
| CN | 1299203 | 6/2001 |
| CN | 1596402 | 3/2005 |
| JP | 2004038709 | 2/2004 |

OTHER PUBLICATIONS

"Multi-Modal Data Access"; Research Disclosure, Oct. 1999/1393-1396.

* cited by examiner

*Primary Examiner* — Benjamin R Bruckart
*Assistant Examiner* — Scott M Sciacca
(74) *Attorney, Agent, or Firm* — Steven M. Greenberg, Esq.; Carey, Rodriguez, Greenberg & O'Keefe

(57) ABSTRACT

Embodiments of the present invention provide a method, system and apparatus for internally initialized, profile-driven data transfer and propagation. In one embodiment, a data transfer and propagation method can include receiving a request from a pervasive device to upload data to a registration server. The method also can include locating a default entry within a profile for the pervasive device and storing the data in a default location for the registration server as specified by the default entry. Finally, the method can include determining from the request whether or not to propagate the data to other registration servers, and responsive to a determination to propagate the data, propagating the data to other registration servers specified in the profile.

13 Claims, 2 Drawing Sheets

INTERNALLY INITIALIZED PROFILE DRIVEN DATA TRANSFER AND PROPAGATION

BACKGROUND OF THE INVENTION

1. Field of the Invention

The present invention relates to data transfer and propagation and more particularly to data transfer among pervasive computing devices and host computing systems.

2. Description of the Related Art

Personal computers no longer are the most common vehicle through which users connect to data communications networks like the Internet. Now that computing can be viewed as being truly everywhere, computer scientists and information technologists have begun to rethink those services that can be provided to meet the needs of mobile computing users. In consequence, the study of pervasive computing has resulted in substantial innovation in the field of network connectivity. "Pervasive computing" has been defined as referring to any non-constrained computing device not physically tethered to a data communications network. Thus, pervasive computing devices refer not only to computers wirelessly linked to networks, but also to handheld computing devices, wearable systems, embedded computing systems and the like.

Pervasive devices enjoy much of the functionality of their larger cousins—the desktop computer. Part of this functionality includes the ability to acquire and store data. While much of the data which can be acquired and stored in a pervasive device is small in size and can be accommodated by the limited storage for the pervasive device, other data, such as acquired digital photographs, can be large in size and the rampant accumulation of large data can quickly overwhelm the resources of the pervasive device. To address the storage of large data, pervasive devices include functionality for transferring acquired and stored data to fatter clients. This process often is referred to as synchronization as the intent is not so much to transfer data from one device to another as it is to maintain equal copies of the data both on the pervasive device and the fat client.

More specifically, data synchronization refers to the harmonization of data between two data sources such that the data contained in each data source can be reconciled notwithstanding changes to the data applied in either or both of the data sources. Modem pervasive devices provide for a synchronization process through a direct cable link, a modem link, or a network link to a host computing device. Wireless pervasive devices further can accommodate synchronization over infrared or radio frequency links. Notwithstanding, data synchronization does not readily provide the capability of merely transferring a file so as to free storage space in the pervasive device. To achieve a mere file transfer, often an end user must acquire separate file management software.

Transferring data files from a pervasive device to a fat host can be a manual, labor intensive process. First, a willing fat host communicatively coupled to the pervasive device must be configured to receive the transferred file. Secondly, the file first must be stored in the pervasive device, and only subsequently, can the stored file be selected for transfer to the fat host. Transferring files to a peer pervasive device can be even more difficult. In the latter circumstance, a communicative link must be established as between the two devices (usually through a line-of-sight technology such as infrared), and only subsequently can the file be transferred. Effectuating a transfer of a single file to multiple, different peer pervasive devices and fat client hosts can only compound the manually intensive process. Acquiring data in a pervasive device further can be limiting in that often the acquisition of a large volume of data, such as a digital photograph, first must be stored in the pervasive device before synchronizing that data with a fat client. The nature of data storage resources in the pervasive device, however, can inhibit the acquisition of large volumes of data due to these limitations.

BRIEF SUMMARY OF THE INVENTION

Embodiments of the present invention address deficiencies of the art in respect to data transfer and propagation and provide a novel and non-obvious method, system and apparatus for internally initialized, profile-driven data transfer and propagation. In one embodiment, a data transfer and propagation method can include receiving a request from a pervasive device to upload data to a registration server. The method also can include locating a default entry within a profile for the pervasive device and storing the data in a default location for the registration server as specified by the default entry. Finally, the method can include determining from the request whether or not to propagate the data to other registration servers, and responsive to a determination to propagate the data, propagating the data to other registration servers specified in the profile.

In another embodiment of the invention, a data processing system for transferring and propagating data can include one or more registration servers configured for communicative coupling to one or more pervasive devices. For example, the pervasive devices can include a laptop computer, a palm top computer, a handheld device, a personal digital assistant, a cellular telephone, or a digital camera. The system further can include data transfer logic disposed in each of the registration servers. The data transfer logic can include programming to process a data transfer and propagation profile for registered ones of the pervasive devices. Specifically, the profile can include a portion defining a default location for saving specified data, and a portion defining at least one other registration server configured to receive propagated data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for internally initialized, profile-driven data transfer and propagation. In accordance with an embodiment of the present invention, distributed computing devices, including pervasive devices, can forward acquired or generated data to a coupled registration server. The registration server can hold a profile for handling the data when received. Specifically, the profile can specify not only the storage of the data in data storage for the coupled registration server, but also the profile can specify whether the data is to be rendered accessible by other devices and servers, and whether the data is to be propagated to other servers and devices. The forwarding of the data can occur automatically upon acquiring or generating the data without requiring end user interaction. Thus, the data transfer can be a seamless, internally initialized process.

Figure 1:
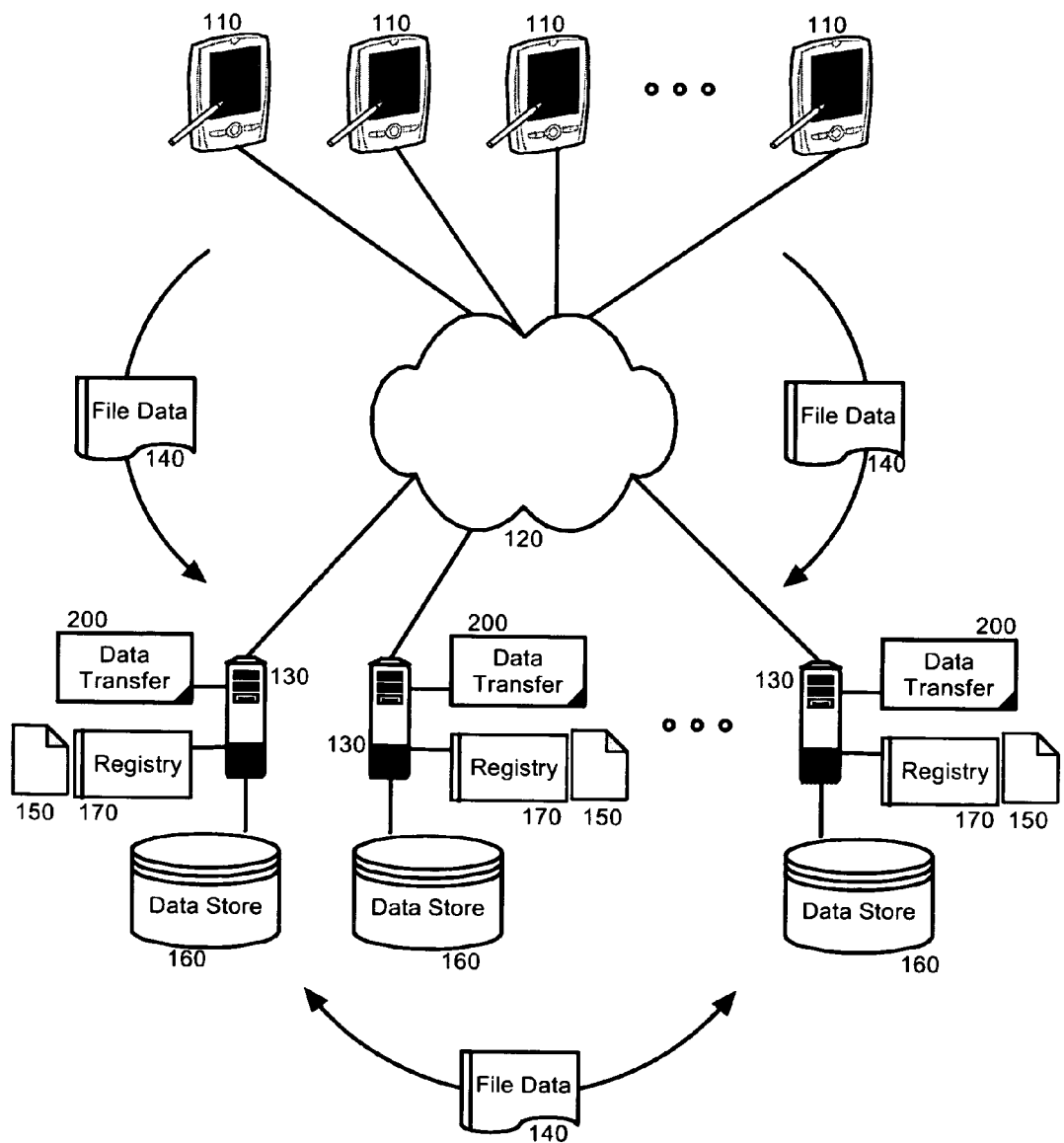
FIG. 1 is a schematic illustration of a data processing system configured for internally initialized, profile-driven data transfer and propagation; and, FIG. 2 is a flow chart illustrating a process for managing internally initialized, profile-driven data transfer and propagation.

In further illustration, FIG. 1 is a schematic illustration of a data processing system configured for internally initialized, profile-driven data transfer and propagation. The data processing system can include one or more client computing devices 110 communicatively coupled to one or more registration servers 130 over a computer communications network 120. The client computing devices 110 can include a pervasive computing device including, by way of example, a laptop or notebook computer, personal digital assistant, palmtop and a handheld computer, to name only a few. Each of the client computing devices 110 can enjoy a wireless communications link with the registration servers 130, for instance a radiofrequency communications link or a cellular telephone link. Alternatively, selected ones of the client computing devices 110 can enjoy a wire-bound communications link with the registration servers 130.

The registration servers 130 each can include a data store 160 in which data received from the client computing devices 110 can be stored. Each of the registration servers 130 further can be configured with a registry 170 of partner pervasive devices which are permitted to transfer data 140 to the registration server 130 for storage in the data store 160. Finally, each of the registration servers 130 can include data transfer logic 200 programmed to manage the receipt and processing of data 140 for storage in the data store 160. The data transfer logic 200 further can be programmed to manage the propagation of data 140 to others of the registration servers 130 and even other ones of the pervasive devices 110.

In this regard, the operation of the data transfer logic 200 can be driven by a profile 150. The profile 150 can specify a number of data transfer parameters including authorization data, a device identifier, and a paired server identifier in which the data 140 is to be stored by default. The profile 150 further can specify the propagation of the data 140 to others of the registration servers 130 and others of the devices 110. Specifically, the profile 150 can specify others of the registration servers 130 which are to receive references to the data 140, and others of the registration servers 130 which are to receive actual copies of the data 140.

As an example, the following markup can be a profile 150 for acquired data 140 in a pervasive device:

```
<ServerS1>
    <Profiles>
        <DeviceD1>
            <DataSave>
                <Location>
                    <Default>
                        <ServerS1><DeviceD1>
                        <Authorization>
                            <UserID><Password>
                        </Authorization>
```

-continued

```
                    </Default>
                    <Also>
                        <ServerS2><DeviceD2>
                        <Authorization>
                            <UserID><Password>
                        </Authorization>
                    </Also>
                    <Buddy>
                        <ServerS3><DeviceD3>
                        <Authorization>
                            <UserID><Password>
                        </Authorization>
                    </Buddy>
                </Location>
            </DataSave>
        </DeviceD1>
        <DeviceD4>
            ...
        </DeviceD4>
    </Profiles>
</ServerS1>
```

In the exemplary markup, the default location can be identified by the server-device pairing ServerS1-DeviceD1 and Server S1-DeviceD4. Moreover, the server-device pairing ServerS2-DeviceD2 can be specified to receive access to the data stored in the default location. Finally, the server-device pairing ServerS3-DeviceD3 can be specified to receive a copy of the data stored in the default location. In all cases, authentication data can be provided such that the server ServerS1 can act as a client to the server ServerS2 and the server ServerS3.

In operation, once the profile 150 has been established, a pervasive device 110 can acquire data 140 responsive to which the pervasive device 110 can forward a data transfer request to a paired one of the registration servers 130. For example, the pervasive device 110 can be pre-configured to reference a specific one of the registration servers 130. The data 140 can include, for example, a digital photograph. The data transfer request can include an identifier for the pervasive device 110, an identifier for the registration server 130, the data 140, authentication information such as a user name and password, and an indication of whether the data 140 is to be stored locally in the registration server 130, and whether the data is to be further propagated to others of the devices 110 and others of the registration servers 130.

Once the registration server 130 has received the request, the registration server 130 can consult the profile 150 and can locate within the profile 130 an entry for the pervasive device 110. Utilizing the entry for the pervasive device 110 in the profile 150, the registration server 130 can determine whether the pervasive device 110 is registered with the registration server 130. If so, the registration server 130 can parse the data save portion of the profile 150 to determine where to store the data 140.

Moreover, if data propagation has been indicated by the request, the registration server 130 can parse the "also" and "buddy" sub-portions of the data save portion of the profile 150 and the registration server 130 can act as a client in passing data save requests to indicated ones of the other registration servers 130. The "also" section can refer to those registration servers 130 which are to receive access to the stored data 140, while the "buddy" section can refer to those registration servers 130 which are to receive complete copies of the stored data 140 so that complete copies of the stored data 140 can be forwarded to coupled ones of the pervasive devices 110 which are associated with those registration servers 130.

Figure 2:
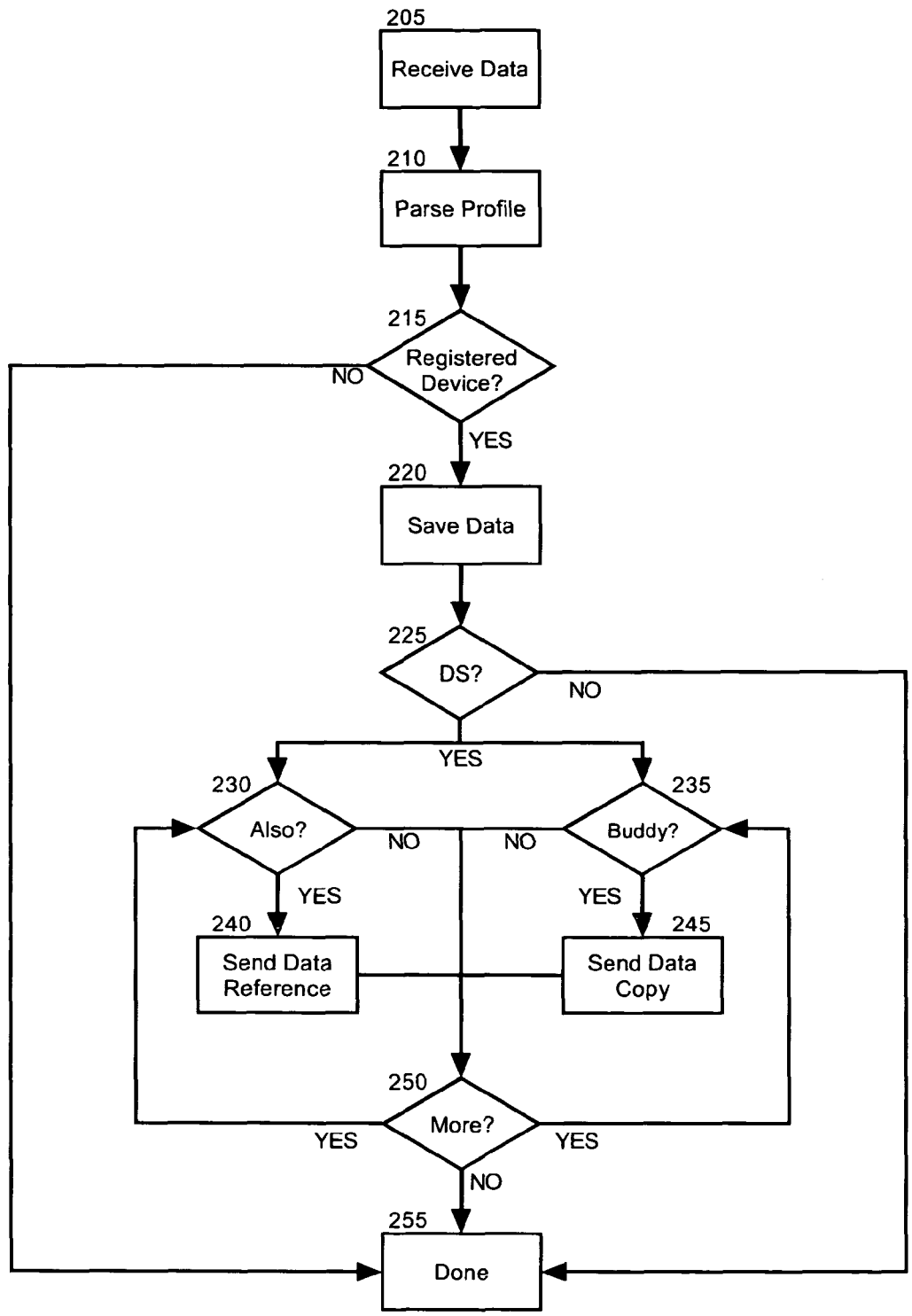

In further illustration, FIG. 2 is a flow chart illustrating a process for managing internally initialized, profile-driven data transfer and propagation. Beginning in block 205, a data transfer request can be received. The data transfer request can include, for instance, acquired data such as a photograph, already stored data such as a file, or even promotional data such as an electronic advertisement. In block 210, a profile can be parsed to identify the requesting device. In decision block 215, it can be determined whether the requesting device is registered and authorized to upload data to the registration server. If so, in block 220, the data can be stored in association with the registration server. Otherwise, the request can be denied and the process can end in block 255.

In decision block 225, it can be determined whether a "data spread" option has been indicated by the request such that the data is to be propagated to other registration servers for other devices. If not the process can end in block 255. Otherwise, in decision block 230 the profile can be parsed to identify registration server-device pairs which are to receive access to the uploaded data. For each identified registration server, authentication information can be passed to the registration server along with a reference to the data such that the server-device pairing can access the data. Likewise, in decision block 235 the profile can be parsed to identify registration server-device pairs which are to receive copies of the uploaded data. For each identified registration server, authentication information can be passed to the registration server along with a copy of the data.

In both circumstances, in decision block 250 it can be determined if additional registration server-device pairings have been specified to propagate the data. If so, the process of blocks 230 through 245 can repeat as before. When no additional registration server-device pairings remain to be processed, the process can end in block 255. The invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAW) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a registration server, a data transfer and propagation method comprising:

receiving a data transfer request from a pervasive device at the registration server, the data transfer request including an identifier for the pervasive device, an identifier for the registration server, data to be transferred, authentication information, and an indication of whether the data is to be stored locally in a registration server, and whether the data is to be further propagated to others devices and servers;

locating a profile corresponding to said pervasive device, wherein the profile specifies authorization data, a device identifier, a paired server identifier in which the data is to be stored by default, servers and devices which are to receive access to the data, and servers and devices which are to receive complete copies of the data;

determining whether the pervasive device is registered with the registration server using the profile;

upon determination that the pervasive device is registered with the registration server, determining where to store the data using the profile;

upon detecting an indication in the data transfer request that the data is to be stored locally in a registration server, storing said data in the default location in the registration server as specified by said profile;

upon detecting an indication in the data transfer request that the data is to be further propagated to others devices and servers, determining from said profile the devices and servers which are to receive access to the data and providing access to the determined devices and servers, and further determining the devices and servers which are to receive complete copies of the data and providing complete copies of the data to the determined devices and servers.

2. The method of claim 1, wherein propagating said data comprises transmitting a reference to a file for said data to specified servers and devices listed in said profile.

3. The method of claim 1, wherein propagating said data comprises transmitting a copy of said data to specified servers and devices listed in said profile.

4. The method of claim 3, wherein transmitting a copy further comprises specifying data propagation for said copy of said data.

5. The method of claim 1, further comprising the step of authenticating said pervasive device using the authentication information disposed in said request.

6. A device including a machine usable storage medium embodying a computer program, the computer program comprising a routine set of instructions which when executed by a machine causes the machine to perform operations comprising:

receiving a data transfer request from a pervasive device at the registration server, the data transfer request including an identifier for the pervasive device, an identifier for the registration server, data to be transferred, authentication information, and an indication of whether the data is to be stored locally in a registration server, and whether the data is to be further propagated to others devices and servers;

locating a profile corresponding to said pervasive device, wherein the profile specifies authorization data, a device identifier, a paired server identifier in which the data is to be stored by default, servers and devices which are to receive access to the data, and servers and devices which are to receive complete copies of the data;

determining whether the pervasive device is registered with the registration server using the profile;

upon determination that the pervasive device is registered with the registration server, determining where to store the data using the profile;

upon detecting an indication in the data transfer request that the data is to be stored locally in a registration server, storing said data in the default location in the registration server as specified by said profile;

upon detecting an indication in the data transfer request that the data is to be further propagated to others devices and servers, determining from said profile the devices and servers which are to receive access to the data and providing access to the determined devices and servers, and further determining the devices and servers which are to receive complete copies of the data and providing complete copies of the data to the determined devices and servers.

7. The device including the machine usable storage medium of claim 6, wherein propagating said data comprises transmitting a reference to a file for said data to specified servers and devices listed in said profile.

8. The device including the machine usable storage medium of claim 6, wherein propagating said data comprises transmitting a copy of said data to servers and devices listed in said profile.

9. The device including the machine usable storage medium of claim 8, wherein transmitting a copy further comprises specifying data propagation for said copy of said data.

10. The device including the machine usable storage medium of claim 6, further comprising the step of authenticating said pervasive device using the authentication information disposed in said request.

11. A data processing system for transferring and propagating data comprising:

a processor configured to perform:

receiving a data transfer request from a pervasive device at the registration server, the data transfer request including an identifier for the pervasive device, an identifier for the registration server, data to be transferred, authentication information, and an indication of whether the data is to be stored locally in a registration server, and whether the data is to be further propagated to others devices and servers;

locating a profile corresponding to said pervasive device, wherein the profile specifies authorization data, a device identifier, a paired server identifier in which the data is to be stored by default, servers and devices which are to receive access to the data, and servers and devices which are to receive complete copies of the data;

determining whether the pervasive device is registered with the registration server using the profile;

upon determination that the pervasive device is registered with the registration server, determining where to store the data using the profile;

upon detecting an indication in the data transfer request that the data is to be stored locally in a registration server, storing said data in the default location in the registration server as specified by said profile;

upon detecting an indication in the data transfer request that the data is to be further propagated to other devices and servers, determining from said profile the devices and servers which are to receive access to the data and providing access to the determined devices and servers, and further determining the devices and servers which are to receive complete copies of the data and providing complete copies of the data to the determined devices and servers.

12. The data processing system of claim 11, wherein the pervasive devices comprise at least one pervasive device selected from the group consisting of a laptop computer, a palm top computer, a handheld device, a personal digital assistant, a cellular telephone, and a digital camera.

13. The data processing system of claim 11, wherein the data comprises a digital photograph.

* * * * *